(12) United States Patent
Kraenzel et al.

(10) Patent No.: US 10,594,729 B2
(45) Date of Patent: Mar. 17, 2020

(54) DYNAMICALLY CONFIGURING A HONEYPOT

(71) Applicant: INTERNATIONAL BUSINESS MACHINES CORPORATION, Armonk, NY (US)

(72) Inventors: Carl Kraenzel, Boston, MA (US); Jeb R. Linton, Manassas, VA (US); Ravi Mani, Scarsdale, NY (US)

(73) Assignee: International Business Machines Corporation, Armonk, NY (US)

(*) Notice: Subject to any disclaimer, the term of this patent is extended or adjusted under 35 U.S.C. 154(b) by 106 days.

(21) Appl. No.: 15/799,647

(22) Filed: Oct. 31, 2017

(65) Prior Publication Data

US 2019/0132359 A1 May 2, 2019

(51) Int. Cl.
*H04L 9/00* (2006.01)
*H04L 29/06* (2006.01)
*G06N 20/00* (2019.01)
*G06F 16/951* (2019.01)

(52) U.S. Cl.
CPC ........ *H04L 63/1491* (2013.01); *G06F 16/951* (2019.01); *G06N 20/00* (2019.01); *H04L 63/1408* (2013.01)

(58) Field of Classification Search
CPC .................................................. H04L 63/1491
USPC .......................................................... 726/22
See application file for complete search history.

(56) References Cited

U.S. PATENT DOCUMENTS

| 7,412,723 | B2 | 8/2008 | Blake et al. |
| 8,578,497 | B2 | 11/2013 | Antonakakis et al. |
| 9,003,524 | B2 | 4/2015 | Baddour et al. |
| 9,727,729 | B2* | 8/2017 | Gupta ..................... G06F 21/52 |
| 9,864,951 | B1* | 1/2018 | Makhijani ............. G06F 17/276 |
| 9,912,695 | B1* | 3/2018 | Chao .................. H04L 63/1491 |
| 2004/0128529 | A1 | 7/2004 | Blake et al. |
| 2012/0151589 | A1 | 6/2012 | Hershey et al. |
| 2014/0366132 | A1 | 12/2014 | Stiansen et al. |
| 2015/0047032 | A1 | 2/2015 | Hannis et al. |
| 2016/0119365 | A1 | 4/2016 | Barel |

OTHER PUBLICATIONS

Anonymously; "Method and Apparatus for Intentional Cognitive Engagement Extender"; http://ip.com/IPCOM/000247821D; Oct. 6, 2016, 4 pages.
Anonymously; "Two layered honeypot for security access of a flow task"; http://ip.com/IPCOM/000206354D; Apr. 19, 2011, 4 pages.
Anonymously; "A Cognitive System to Assess as Soon as Possible Security Exposures in a Customer Environment"; http://ip.com/IPCOM/000249244D; Feb. 14, 2017, 6 pages.

* cited by examiner

*Primary Examiner* — Christopher J Brown
(74) *Attorney, Agent, or Firm* — Conley Rose, P.C.

(57) ABSTRACT

A computer-implemented method includes crawling, by a web crawler, one or more webpages to gather information, resulting in gathered information. The computer-implemented method includes obtaining, by a honeypot logger, activity log data of one or more hackers that access a portion of honeypot content deployed by a honeypot. The computer-implemented method includes dynamically configuring, by a machine capable of learning, the honeypot using the activity log data and the gathered information.

17 Claims, 6 Drawing Sheets

DYNAMICALLY CONFIGURING A HONEYPOT

BACKGROUND

The present disclosure relates to honeypots. Honeypots are used to draw the attention of hackers away from potentially vulnerable targets, to waste hackers' time attacking a false target, and to gather information about hackers' tools and methods of attack. Current techniques to attract and hold the attention of hackers without the hackers detecting the honeypot require manual reconfiguration and customization of the honeypot and are not effective. There is a need to configure honeypots to attract and hold the attention of hackers without the hackers detecting the honeypot system.

SUMMARY

According to an embodiment of the present disclosure, a computer-implemented method includes crawling, by a web crawler, one or more webpages to gather information, resulting in gathered information. The computer-implemented method further includes obtaining, by a honeypot logger, activity log data of one or more hackers that access a portion of honeypot content deployed by a honeypot. The computer-implemented method further includes dynamically configuring, by a machine capable of learning, the honeypot using the activity log data and the gathered information. Dynamically configuring the honeypot based on detected activity from hackers and based on the gathered information results in the honeypot appearing more interesting to hackers.

In some optional implementations, dynamically configuring the honeypot using the activity log data and the gathered information includes parsing the activity log data to determine first categories associated with the portion of the honeypot content that is accessed by the one or more hackers, performing topic detection on the gathered information to identify one or more topics, and selecting the honeypot content based on the first categories and the one or more topics. In some optional implementations, the first categories associated with the portion of the honeypot content that is accessed by hackers are indicative of which categories of honeypot content the hackers are interested in. In some optional implementations, the topics associated with the gathered information are indicative of current events that are likely to be of interest to the hackers. Selecting the honeypot content based on information indicative of which categories of honeypot content the hackers are interested in and based on gathered information indicative of current events that are likely to be of interest to the hackers increases the chances that the honeypot will appear more attractive to the hackers.

In some optional implementations, the computer implemented method includes generating one or more documents or log files using the gathered information, and adding the one or more documents or log files to the candidate content. Because the computer-implemented method generates content based on the gathered information, the honeypot content may appear more up to date and therefore less likely to trigger a hacker to detect that the honeypot is a honeypot.

Embodiments of the disclosure also include a system and a computer program product that includes a computer readable storage medium having program instructions embodied therewith.

DETAILED DESCRIPTION

Figure 1:
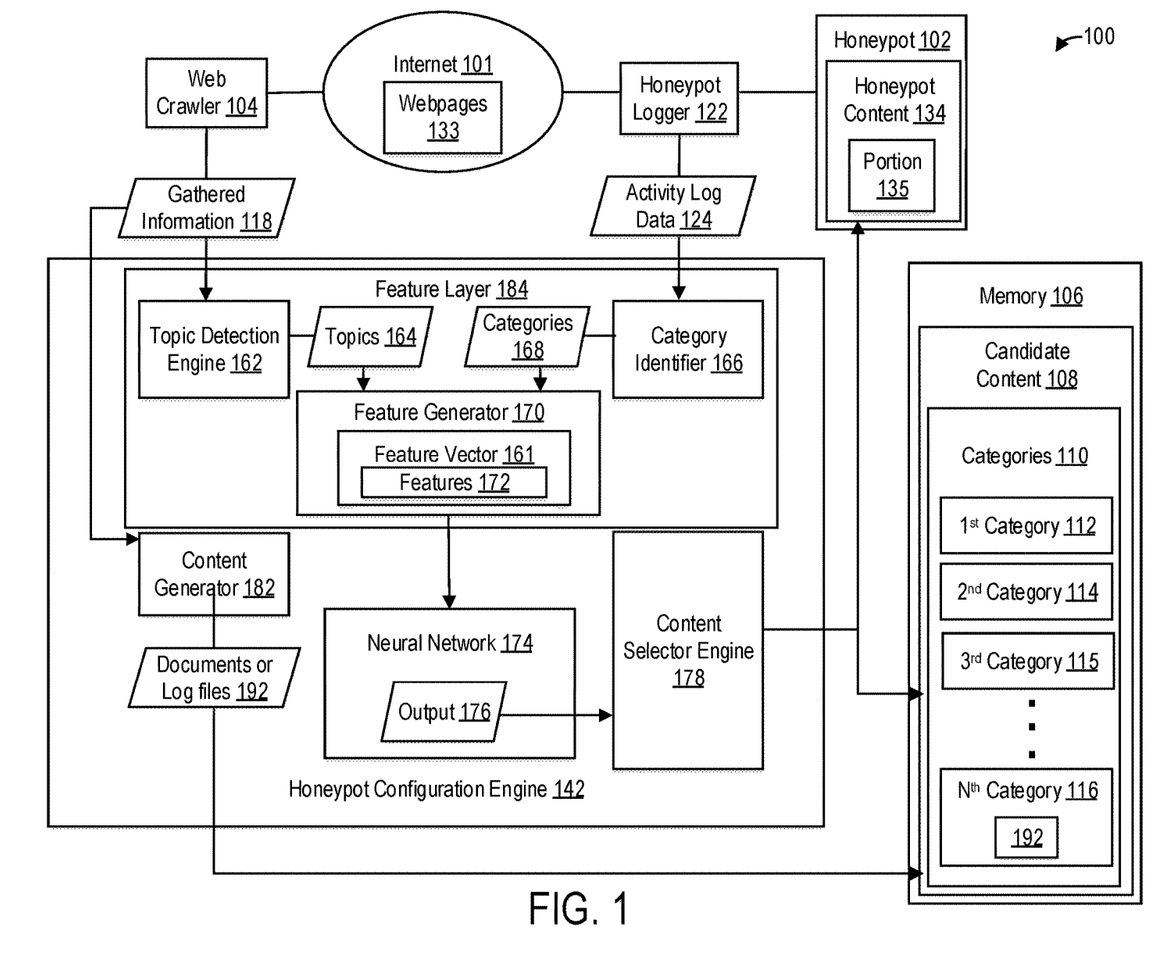
FIG. 1 shows an illustrative block diagram of a system configured to dynamically configure a honeypot using activity log data from a honeypot logger and using information gathered by a web crawler.

With reference now to FIG. 1, a block diagram of a system 100 configured to dynamically configure a honeypot 102 is illustrated. The system 100 may be used by a company or organization to draw the attention of hackers away from potentially vulnerable targets, to waste hackers' time attacking a false target, and to gather information about hackers' tools and methods of attack. The system 100 includes a honeypot configuration engine 142 coupled to a memory 106. The memory 106 stores candidate content 108. The honeypot 102 deploys honeypot content 134 that is selected from the candidate content 108 as described in more detail below. The memory 106 corresponds to, or includes, a tangible device that can retain and store the candidate content 108. The memory 106 may be, for example, but is not limited to, an electronic storage device, a magnetic storage device, an optical storage device, an electromagnetic storage device, a semiconductor storage device, or any suitable combination of the foregoing. A non-exhaustive list of more specific examples of the memory 106 includes the following: a portable computer diskette, a hard disk, a random access memory (RAM), a read-only memory (ROM), an erasable programmable read-only memory (EPROM) or Flash memory, a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

The candidate content 108 includes different categories 110 of content. For example, the candidate content 108 may include N categories of content, where N is greater than one. To illustrate, the different categories 110 of content may include a first category 112 of content, a second category 114 of content, a third category 115 of content, and an Nth category 116 (e.g., a fourth or greater than fourth) of content. In some examples, the first category 112 of content corresponds to financial data content, the second category 114 of content corresponds to strategy content, the third category 115 of content corresponds to health care data content, and the Nth category 116 of content corresponds to intellectual property data content.

The system 100 additionally includes a web crawler 104 configured to crawl one or more webpages 133 to gather information, resulting in gathered information 118. The gathered information 118 may include current news articles and social media activity regarding a company or organization that uses the system 100. For example, the web crawler 104 may be configured to be connected to the Internet 101 via a wired or wireless connection, such as a wireless local area network ("WLAN"), and the web crawler 104 may configured with a web crawling capability, such as Blekko™ or AlchemyData News, to crawl the web to gather information (e.g., articles, documents, blog material, social media information regarding the company) from websites.

The system 100 includes a honeypot logger 122 (e.g., a honeywall) to obtain activity log data 124 of one or more hackers that access a portion 135 of the honeypot content 134 deployed by the honeypot 102. The honeypot logger 122 is configured to be connected to the Internet 101 via a wired or wireless connection, such as a WLAN. The activity log data 124 may indicate which documents, data, folders, or targets the one or more hackers access, a time of the access, a duration of the access, and/or a number of accesses. The honeypot logger 122 may be configured to obtain the activity log data 124 using keystroke logging techniques. However, the honeypot logger 122 may employ additional or alternative techniques to keystroke logging to obtain the activity log data 124.

The honeypot configuration engine 142 is coupled to the web crawler 104 and the honeypot logger 122 and is configured with machine learning capability (e.g., a neural network 174) to dynamically configure the honeypot 102 using the activity log data 124 and the gathered information 118. The honeypot configuration engine 142 is configured to dynamically configure the honeypot 102 by selecting which content of the candidate content 108 to deploy via the honeypot 102.

The honeypot configuration engine 142 includes a feature layer 184 that includes a topic detection engine 162, a category identifier 166, and a feature generator 170. The topic detection engine 162 is configured with topic detection or modeling capability to perform topic detection on the gathered information 118 to identify one or more topics 164 related to a company or organization that uses the system 100. In some examples, the one or more topics 164 are indicative of current events regarding the company or organization that uses the system 100 and that are likely to be of interest to hackers. In some examples, the topic detection engine 162 is configured with modeling capability such as latent Dirichlet allocation (LDA) capability, latent semantic analysis (LSA), and/or term frequency-inverse document frequency (TF-IDF) capability to perform the topic detection. The category identifier 166 is configured to parse the activity log data 124 to determine first categories 168 associated with the portion 135 of the honeypot content 134 that is accessed by the one or more hackers. In some examples, the first categories 168 are indicative of which categories of the honeypot content 134 the one or more hackers are interested in.

The feature generator 170 is configured to extract features 172 using the one or more topics 164 and using the first categories 168, and is configured to generate a feature vector 161 based on the features 172. The feature generator 170 is configured to provide the feature vector 161 for input to the neural network 174. The neural network 174 is configured to process the feature vector 161 to generate output 176. In some examples, the neural network 174 is or includes a multilayer perceptron. Alternatively or additionally, the neural network 174 is or includes a Restricted Boltzmann machine. Alternatively or additionally, the neural network 174 is or includes a Deep Belief Network. In some examples, the neural network 174 is trained using labeled training data based on the activity log data 124 as described in more detail below with reference to FIG. 2. The neural network 174 is configured to generate the output 176 by applying network weights or biases, along with one or more activation functions, to data passing through the neural network 174. In some examples, the output 176 may correspond to weights or biases. For example, the output 176 may include weights, and each of the weights may be associated with a respective category of the different categories 110 of the candidate content 108. In some examples, each of the weights of the output 176 is indicative of how much of a particular category of the different categories 110 to include in the honeypot content 134. The neural network 174 may be trained (e.g., by configuring the network weights and biases of the neural network 174) using labeled training data generated based on the activity log data 124 as described in more detail below with reference to FIG. 2.

The honeypot configuration engine 142 includes a content selector engine 178 configured to select the honeypot content 134 based on the output 176 generated by the neural network 174 using features extracted from the first categories 168 and the one or more topics 164. To illustrate, in an example, the output 176 includes weights, and each of the output weights is associated with a respective category of the different categories 110 of the candidate content 108. In this example, each of the weights of the output 176 is indicative of how much of a particular category of the different categories 110 to include in the honeypot content 134. In this example, the content selector engine 178 is configured to select the honeypot content 134 from the candidate content 108 based on the weights in the output 176. For example, the weights in the output 176 may include a first weight indicating how much of the first category 112 of content to include in the honeypot content 134, a second weight indicating how much of the second category 114 of content to include in the honeypot content 134, a third weight indicating how much of the third category 115 of content to include in the honeypot content 134, and an Nth weight indicating how much of the Nth category 116 of content to include in the honeypot content 134.

Thus, the honeypot configuration engine 142 is configured to select content for the honeypot 102 based on weights or biases output from a neural network that is fed feature input based on the gathered information 118 and the activity log data 124. Because the honeypot content 134 is selected based on detected activity from hackers and information of interest (e.g., gathered information 118), the honeypot 102 may appear more interesting to hackers than honeypots that do not select content in consideration of hacker activity on the honeypot 102 and based on information of interest.

In response to selecting the honeypot content 134, the honeypot configuration engine 142 is configured to cause the honeypot 102 to deploy the honeypot content 134. For example, the honeypot configuration engine 142 may send the honeypot 102 one or more instructions that causes the honeypot 102 to make the honeypot content 134 selected by the honeypot configuration engine 142 available to potential hackers.

In some examples, the honeypot configuration engine 142 is configured to additionally or alternatively dynamically configure the honeypot 102 by generating content (e.g., documents of log files 192) based on the gathered information 118. For example, the honeypot configuration engine 142 may include a content generator 182 configured to generate fake notes appearing to be about the gathered information 118 (e.g., new articles) or appearing to tie the gathered information 118 (e.g., news articles) to fake project names assigned to the honeypot content 134. In some examples, the content generator 182 stores a set of template notes that include blank portions for insertion of topics detected from the gathered information 118. In some examples, the template notes are stored in the form of email, text messaging log files, or email ostensibly pasted into documents. The honeypot configuration engine 142 is configured to cause the documents or log files 192 to be added to the candidate content 108 stored in the memory 106. Because the honeypot configuration engine 142 generates content based on the gathered information 118, the honeypot content 134 may appear more up to date and therefore less likely to trigger a hacker to detect that the honeypot 102 is a honeypot.

The honeypot 102 configured using the honeypot configuration engine 142 may be deployed by an entity such as a company or organization that employs production systems. When deployed, the configured honeypot 102 makes available or accessible the honeypot content 134 to one or more hackers, and the honeypot logger 122 may be configured to gather information that the entity deploying the honeypot 102 can use to secure the entity's production systems.

Figure 2:
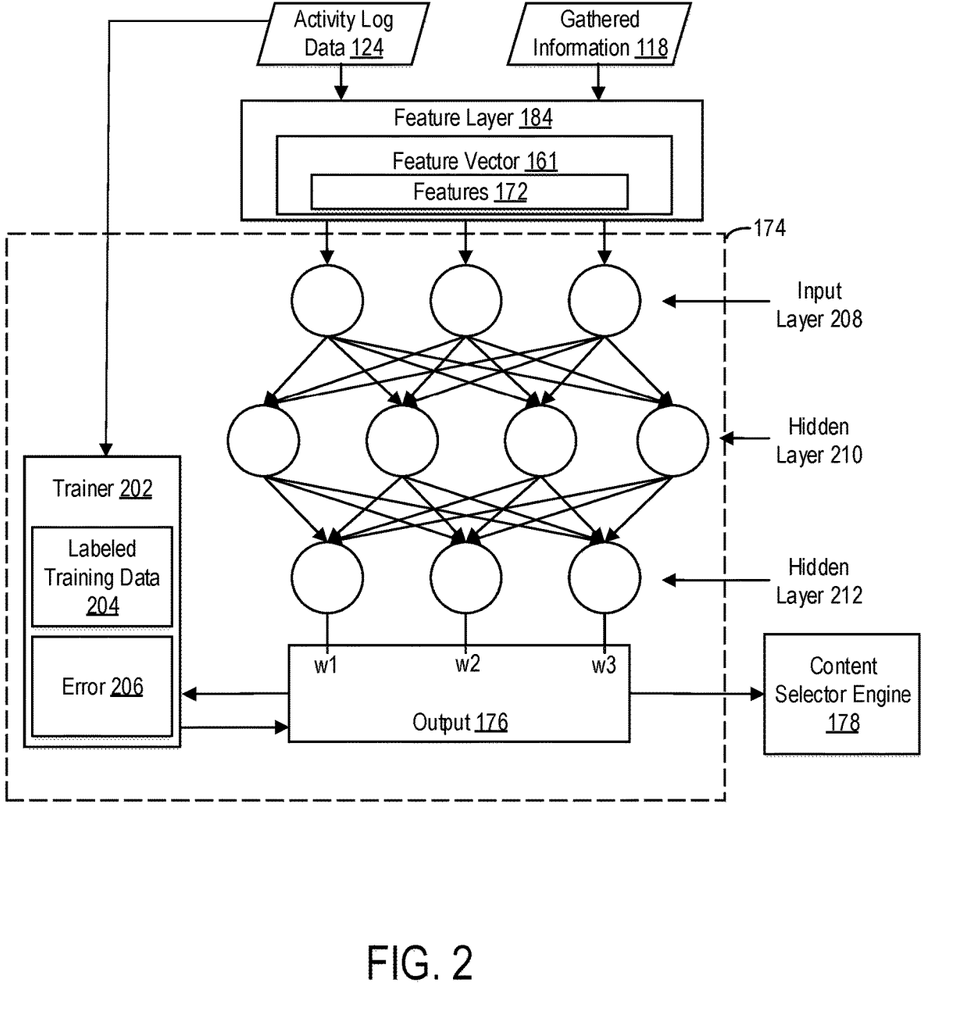
FIG. 2 shows an illustrative diagram of an example of neural network of the system of FIG. 1.

FIG. 2 illustrates an example of the neural network 174 of FIG. 1. The neural network 174 of FIG. 2 may correspond to a multilayer perceptron. The neural network 174 of FIG. 2 includes an input layer 208 (e.g., a visible layer) configured to receive the feature vector 161 from the feature layer 184. The neural network 174 of FIG. 2 also includes a hidden layer 210 and a hidden layer 212. Although the neural network 174 of FIG. 2 is illustrated as including two hidden layers, in other examples, the neural network 174 includes more than or less than two hidden layers.

Each node in the hidden layers 210 and 212 is a neuron that maps inputs to the outputs by performing linear combination of the inputs with the node's network weight(s) and bias and applying a nonlinear activation function. The hidden layer 212 may correspond to an output layer, and a number of nodes in the output layer may correspond to a number of classes or categories of content. For example, the different categories 110 of the candidate content 108 of FIG. 1 may include N categories, and the number of nodes in the output layer may therefore also include N categories. The output 176 includes a plurality of weights w1, w2, and w3. Although the output 176 is illustrated as including three output weights, in other examples, the output 176 includes more than or less than three output weights (e.g., the output 176 may include a number of output weights corresponding to a number of the different categories 110). The weights w1, w2, and w3 may be associated with the different categories 110 of the candidate content 108 of FIG. 1 and may be provided to the content selector engine 178. For example, the different categories 110 of content may include N=3 categories. In this example, the first weight w1 may be associated with the first category 112 of FIG. 1, the second weight w2 may be associated with the second category 114 of FIG. 1, and the third weight w3 may be associated with the third category 115 of FIG. 1. The content selector engine 178 may select how much of the first category 112 of the candidate content 108 to include in the honeypot content 134 based on the first weight w1. Additionally or alternatively, the content selector engine 178 may select how much of the second category 114 of the candidate content 108 to include in the honeypot content 134 based on the second weight w2. Additionally or alternatively, the content selector engine 178 may select how much of the Nth category 116 of the candidate content 108 to include in the honeypot content 134 based on the third weight w3.

The neural network 174 of FIG. 2 includes a trainer 202 configured to train the neural network 174 of FIG. 2 using labeled training data 204. The labeled training data 204 is based on the activity log data 124. The trainer 202 is configured to perform supervised learning using a back-propagation algorithm based on the labeled training data 204. The back-propagation may include a backward pass through the neural network 174 that follows a forward pass through the neural network 174. For example, in the forward pass, the outputs 176 corresponding to given inputs (e.g., the features 172) are evaluated. In the backward pass, partial derivatives of the cost function with respect to the different parameters are propagated back through the neural network 174. The network weights can then be adapted using any gradient-based optimization algorithm. The whole process may be iterated until the network weights have converged.

Although FIG. 2 illustrates an example of the neural network 174 of FIG. 1 as a multiplayer perceptron, in other examples, the neural network 174 of FIG. 1 is implemented as a Restricted Boltzmann machine or a Deep Belief Network that is trained using training data based on the activity log data 124 and that is configured to generate output responsive to the features 172.

Figure 3:
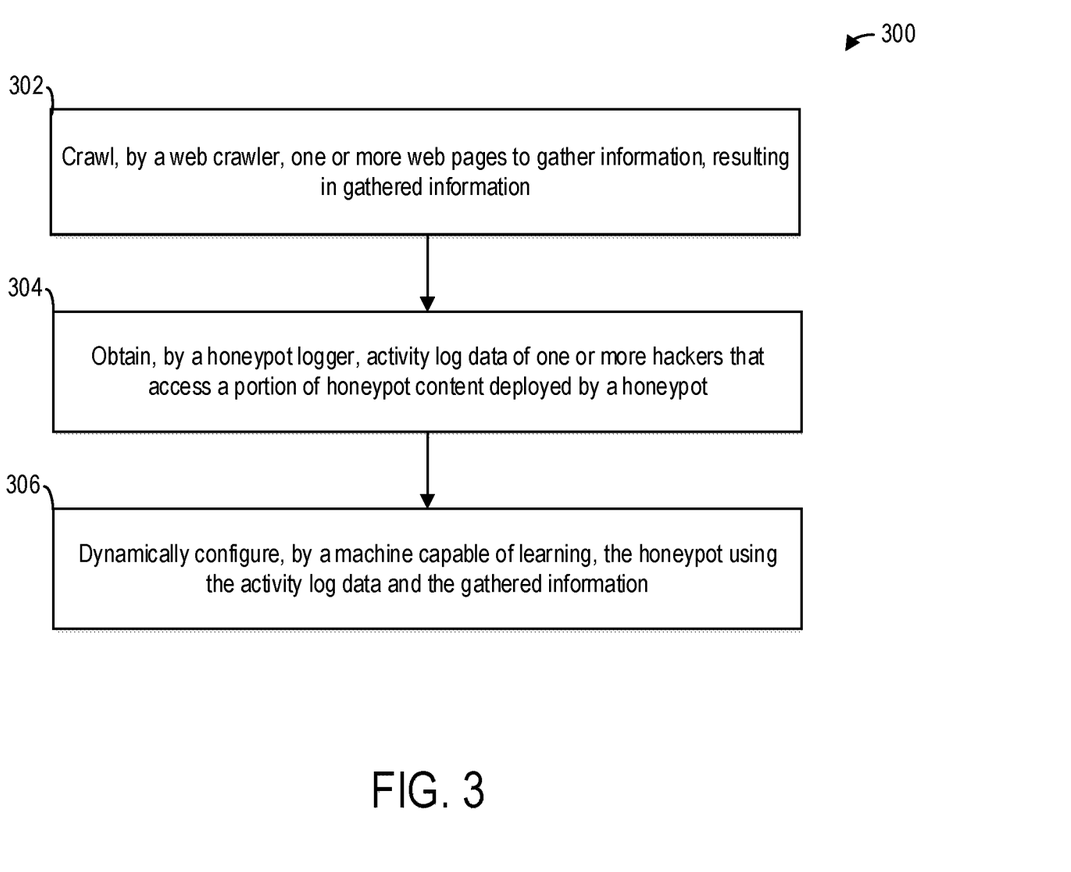
FIG. 3 shows an illustrative flowchart illustrating aspects of operations that may be performed to dynamically configure a honeypot.

With reference to FIG. 3, a computer-implemented method 300 of dynamically configuring a honeypot is described. The computer-implemented method 300 may be performed by the web crawler 104, the honeypot logger 122, and the honeypot configuration engine 142 described above with reference to FIG. 1.

The computer-implemented method 300 includes, at 302, crawling, by a web crawler, one or more webpages to gather information, resulting in gathered information. The web crawler may correspond to the web crawler 104 described above with reference to FIG. 1, and the one or more webpages may correspond to the one or more webpages 133 described above with reference to FIG. 1. The gathered information may correspond to the gathered information 118 described above with reference to FIG. 1. For example, the gathered information may include current news articles and social media activity about regarding a company that uses the system 100. For example, the web crawler 104 of FIG. 1 may be configured to be connected to the Internet 101 via a wired or wireless connection, such as a WLAN, and the web crawler 104 may configured with a web crawling capability, such as Blekko™ or AlchemyData News, to crawl the web to gather information (e.g., articles, documents, blog material, social media information regarding the company) from websites.

The computer-implemented method 300 includes, at 304, obtaining, by a honeypot logger, activity log data of one or more hackers that access a portion of honeypot content deployed by a honeypot. The honeypot logger may correspond to the honeypot logger 122 described above with reference to FIG. 1. The honeypot may correspond to the honeypot 102 described above with reference to FIG. 1, the honeypot content may correspond to the honeypot content 134 described above with reference to FIG. 1, and the portion of the honeypot may correspond to the portion 135 described above with reference to FIG. 1. The activity log data may correspond to the activity log data 124 of FIG. 1 and may be obtained as described above with reference to FIG. 1. For example, the activity log data may be obtained by the honeypot logger 122 of FIG. 1 using a keystroke logging technique. However, the activity log data may be obtained using one or more techniques additional or alternative to keystroke logging.

The computer-implemented method 300 further includes, at 306, dynamically configuring, by a machine capable of learning, the honeypot using the activity log data and the gathered information. The honeypot may be dynamically configured using the honeypot configuration engine 142 described above with reference to FIG. 1.

In some examples, dynamically configuring the honeypot using the activity log data and the gathered information includes parsing the activity log data to determine first categories associated with the portion of the honeypot content that is accessed by the one or more hackers. For example, the activity log data may be parsed using the category identifier 166 as described above with reference to FIG. 1, and the first categories may correspond to the first categories 168 described above with reference to FIG. 1. In some examples, the first categories are indicative of which categories of the honeypot content the one or more hackers are interested in. In examples in which dynamically configuring the honeypot includes parsing the activity log data, dynamically configuring the honeypot further includes performing topic detection on the gathered information to identify one or more topics. For example, the topic detection engine 162 described above with reference to FIG. 1 may perform topic detection on the gathered information 118 to determine the one or more topics 164 of FIG. 1 as described above with reference to FIG. 1. In some examples, the one or more topics are indicative of current events that are likely to be of interest to the hackers. In these examples, dynamically configuring the honeypot further includes selecting the honeypot content based on the first categories and the one or more topics. Selecting the honeypot content based on information indicative of which categories of honeypot content the hackers are interested in and based on gathered information indicative of current events that are likely to be of interest to the hackers increases the chances that the honeypot will appear more attractive to the hackers.

In some examples of the computer-implemented method 300, dynamically configuring the honeypot using the activity log data and the gathered information comprises determining a feature vector using the first categories and the one or more topics. For example, the feature generator 170 described above with reference to FIG. 1 may generate the feature vector 161 of FIG. 1 that includes the features 172 as described above with reference to FIG. 1. In some of these examples, the computer-implemented method 300 further includes determining, by the machine capable of learning, weights associated with different categories of candidate content based on the feature vector. For example, the weights may correspond to the weights of the output 176 described above with reference to FIGS. 1 and 2. In some examples, the weights correspond to the weights w1, w2, and w3 described above with reference to FIG. 2. The weights may be generated by the neural network 174 as described above with reference to FIGS. 1 and 2. In some examples, the computer-implemented method 300 includes selecting the honeypot content from the candidate content based on the weights in the output from the neural network. For example, the content selector engine 178 may receive the output 176 including the weights, and may select how much of the candidate content 108 to include in the honeypot content 134 based on the weights in the output 176 as described above with reference to FIGS. 1 and 2.

In some examples, dynamically configuring the honeypot using the activity log data and the gathered information includes using the activity log data and the gathered information to configure an amount of each category of candidate content to include in the honeypot content. For example, the honeypot configuration engine 142 of FIG. 1 may determine the one or more topics 164 and the first categories 168 based on the gathered information 118 and the activity log data 124, respectively, and may determine the output 176 based on the features 172 generated by the feature generator 170 as described in FIG. 1. The output 176 may include weights associated with the different categories 110 of FIG. 1. In some examples, the different categories of content include a first category of content corresponding to financial data content, a second category of content corresponding to strategy content, a third category of content corresponding to health care data content, and a fourth category of content corresponding to intellectual property data content. In these examples, dynamically configuring the honeypot using the activity log data and the gathered information includes using the activity log data and the gathered information to configure an amount of the first category of content to include in the honeypot content, an amount of the second category of content to include in the honeypot content, an amount of the third category of content to include in the honeypot content, and an amount of the fourth category of content to include in the honeypot content.

In some examples, the computer-implemented method 300 further includes generating one or more documents or log files using the gathered information. For example, the content generator 182 of FIG. 1 may generate one or more documents of log files 192 as described above with reference to FIG. 1, and the honeypot configuration engine 142 of FIG. 1 may add the one or more documents or log files to the candidate content 108 of FIG. 1. Generating content based on the gathered information results in the candidate content 108 being more up to date. Because the honeypot content 134 is selected form the candidate content 108, and because generating content based on the gathered information results in the candidate content 108 being more up to date, generating content based on the gathered information results in the honeypot content 134 being more up to date and therefore less likely to result in a hacker detecting that the honeypot is a honeypot.

Figure 4:
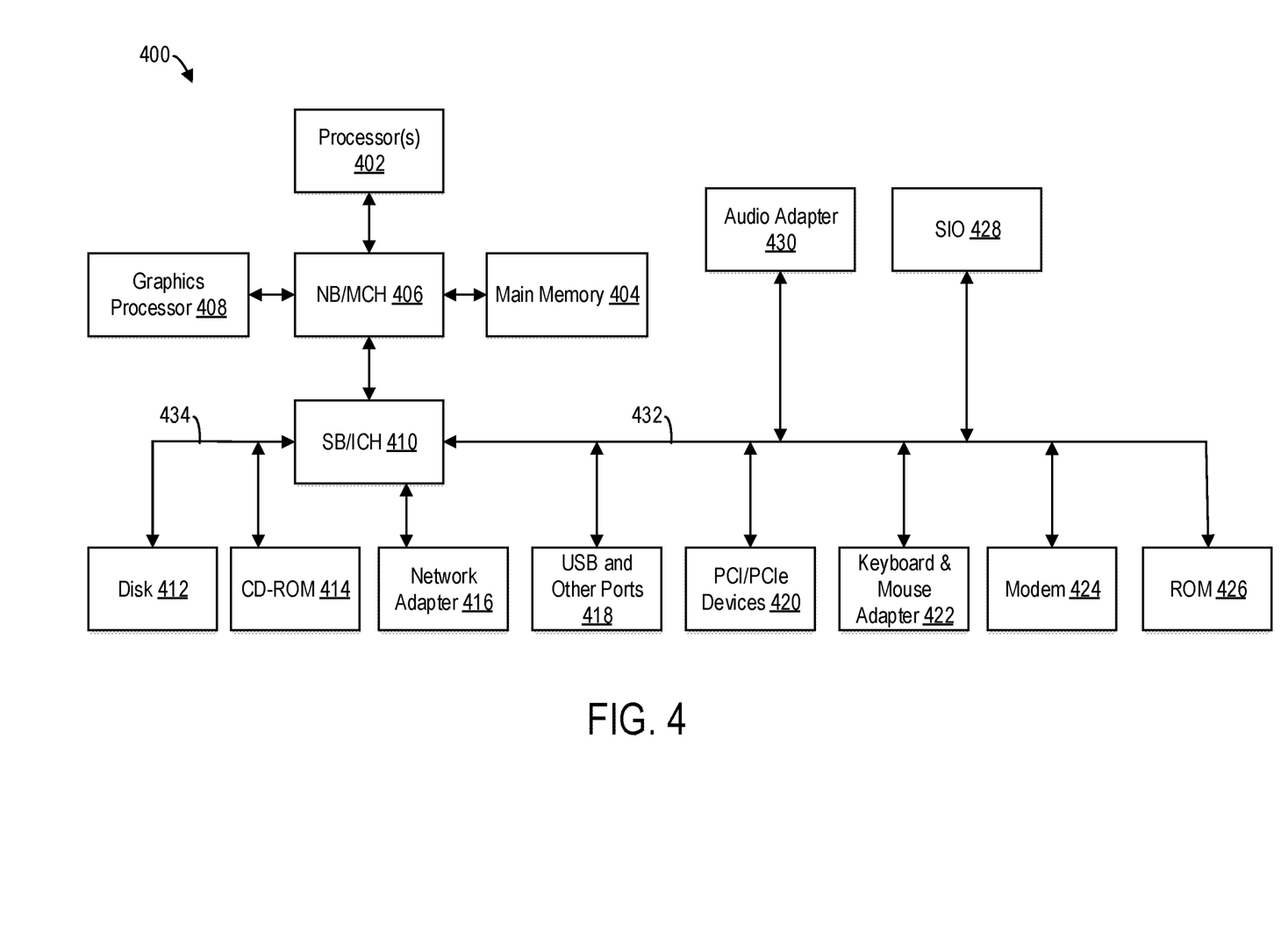
FIG. 4 shows an illustrative block diagram of an example system that can be applied to implement embodiments of the present disclosure.

FIG. 4 is a block diagram of an example of a system 400 in which aspects of the illustrative embodiments may be implemented. The system 400 is an example of a computer that can be applied to implement aspects of the system 100 (e.g., the web crawler 104, the honeypot logger 122, and the honeypot configuration engine 142) of FIG. 1 and in which computer usable code or instructions implementing the processes for illustrative embodiments of the system may be located. In one illustrative embodiment, FIG. 4 represents a computing device that implements the system 100 of FIG. 1 augmented to include the additional mechanisms of the illustrative embodiments described hereafter.

In the depicted example, the system 400 employs a hub architecture including north bridge and memory controller hub (NB/MCH) 406 and south bridge and input/output (I/O) controller hub (SB/ICH) 410. Processor(s) 402, main memory 404, and graphics processor 408 are connected to NB/MCH 406. Graphics processor 408 may be connected to NB/MCH 406 through an accelerated graphics port (AGP).

In the depicted example, local area network (LAN) adapter 416 connects to SB/ICH 410. Audio adapter 430, keyboard and mouse adapter 422, modem 424, ROM 426, a hard disk drive (HDD) 412, compact disc read only memory (CD-ROM) drive 414, universal serial bus (USB) ports and other communication ports 418, and peripheral component interconnect/peripheral component interconnect express (PCI/PCIe) devices 420 connect to SB/ICH 410 through bus 432 and bus 434. PCI/PCIe devices may include, for example, Ethernet adapters, add-in cards, and personal computer (PC) cards for notebook computers. PCI uses a card bus controller, while PCIe does not. ROM 426 may be, for example, a flash basic input/output system (BIOS).

HDD 412 and CD-ROM drive 414 connect to SB/ICH 410 through bus 434. HDD 412 and CD-ROM drive 414 may use, for example, an integrated drive electronics (IDE) or serial advanced technology attachment (SATA) interface. Super I/O (SIO) device 428 may be connected to SB/ICH 410.

An operating system runs on processor(s) 402. The operating system coordinates and provides control of various components within the system 400 in FIG. 4. In some embodiments, the operating system may be a commercially available operating system such as Microsoft® Windows 10®. An object-oriented programming system, such as the Java™ programming system, may run in conjunction with the operating system and provides calls to the operating system from Java™ programs or applications executing on the system 400.

In some embodiments, the system 400 may be, for example, an IBM® eServer™ System P® computer system, running the Advanced Interactive Executive (AIX®) operating system or the LINUX® operating system. The system 400 may be a symmetric multiprocessor (SMP) system including a plurality of processors 402. Alternatively, a single processor system may be employed.

Instructions for the operating system, the object-oriented programming system, and applications or programs are located on storage devices, such as HDD 412, and may be loaded into main memory 404 for execution by processor(s) 402. The processes for illustrative embodiments of the present disclosure may be performed by processor(s) 402 using computer usable program code, which may be located in a memory such as, for example, main memory 404, ROM 426, or in one or more peripheral devices 412 and 414, for example.

A bus system, such as bus 432 or bus 434 as shown in FIG. 4, may include one or more buses. The bus system may be implemented using any type of communication fabric or architecture that provides for a transfer of data between different components or devices attached to the fabric or architecture. A communication unit, such as modem 424 or LAN adapter 416 of FIG. 4, may include one or more devices used to transmit and receive data. A memory may be, for example, main memory 404, ROM 426, or a cache such as found in NB/MCH 406 in FIG. 4.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an EPROM or Flash memory, an SRAM, a portable CD-ROM, a DVD, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or eternal storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
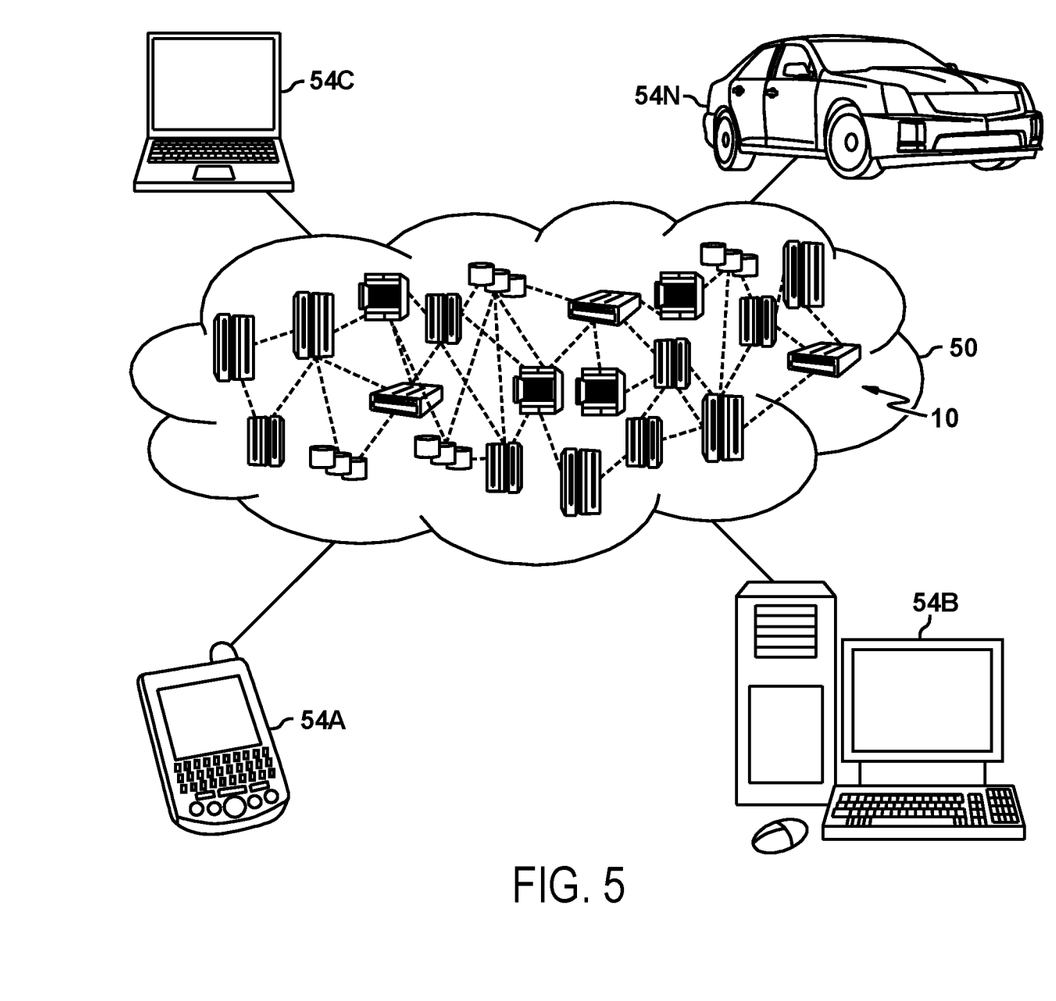
FIG. 5 depicts a cloud computing environment according to various embodiments.
Figure 6:
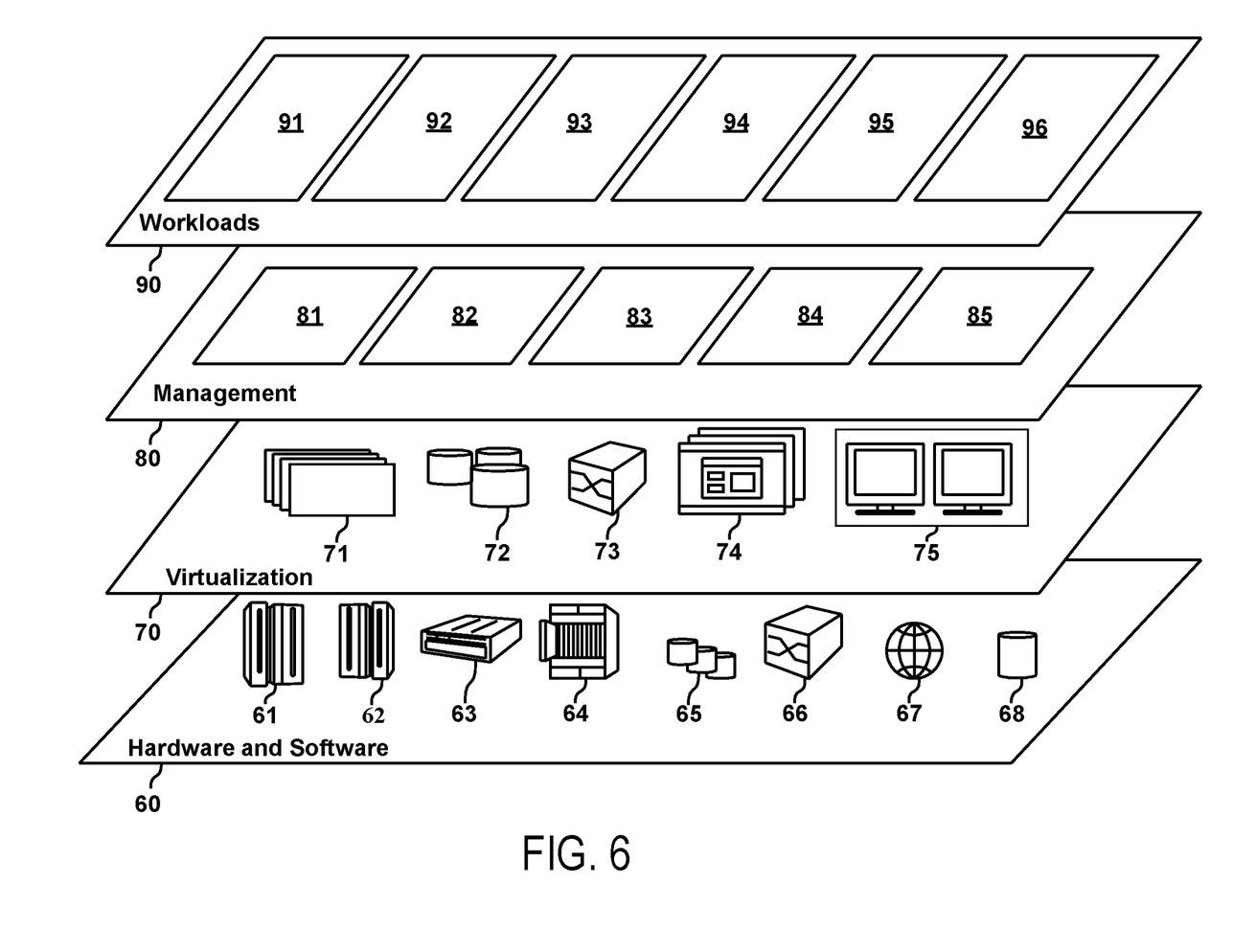
FIG. 6 depicts abstraction model layers according to various embodiments.

Turning now to FIGS. 5 and 6, it is to be understood that although this disclosure includes a detailed description related to cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

The cloud model characteristics may include on-demand self-service, broad network access, resource pooling, rapid elasticity, and/or measured service. On-demand self-service is a characteristic in which a cloud consumer can unilaterally provision computing capabilities, such as server time and network storage, as needed automatically without requiring human interaction with the service's provider. Broad network access is a characteristic in which capabilities are available over a network and accessed through standard mechanisms that promote use by heterogeneous thin or thick client platforms (e.g., mobile phones, laptops, and personal digital assistants (PDAs)). Resource pooling is a characteristic in which the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity is a characteristic in which capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service is a characteristic in which cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The cloud model Service Models may include Software as a Service (SaaS), Platform as a Service (PaaS), and/or Infrastructure as a Service (IaaS).

SaaS is a service model in which the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings. PaaS is a service model in which the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. IaaS is a service model in which the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The cloud model Deployment Models may include private cloud, community cloud, public cloud, and/or hybrid cloud. Private cloud is a deployment model in which the cloud infrastructure is operated solely for an organization. It may be managed by the organization or a third party and may exist on-premises or off-premises. Community cloud is a deployment model in which the cloud infrastructure is shared by several organizations and supports a specific community that has shared concerns (e.g., mission, security requirements, policy, and compliance considerations). It may be managed by the organizations or a third party and may exist on-premises or off-premises. Public cloud is a deployment model in which the cloud infrastructure is made available to the general public or a large industry group and is owned by an organization selling cloud services. Hybrid cloud is a deployment model in which the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices used by cloud consumers, such as, for example, PDA or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. The hardware and software components of hardware and software layer 60 may serve as the underlying computing components on which cloud computing functions are executed in response to receipt of a request for performance of a function and/or service offered as a part of cloud computing environment 50 such as, for example, the domain adaptation described above.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. These virtual entities may enable a subscriber to cloud computing environment 50 to interact indirectly with the hardware and software components of hardware and software layer 60 indirectly via virtual layer 70 without having a specific knowledge of, or interacting directly with, hardware and software layer 60. For example, a plurality of subscribers may interact with virtualization layer 70 to respectively access a corresponding plurality of virtual servers 71 and virtual storage 72 that all exist as separate threads, instances, partitions, etc., on a single server 62 and storage device 65, respectively. In such a scenario, virtualization layer 70 may cause each virtual server 71 and virtual storage 72 to appear to each subscriber as a dedicated and seamless computing and storage device, while enabling efficient operation of the hardware and software components of hardware and software layer 60 by reducing a potential for redundancy of components.

In one example, management layer 80 may provide the functions described below via an abstraction layer such that a subscriber to cloud computing environment 50 may interact with virtualization layer 70 and/or hardware and software layer 60 indirectly via management layer 80 without having a specific knowledge of, or interacting directly with, virtualization layer 70 and/or hardware and software layer 60. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA. Management layer 80 enables a subscriber to cloud computing environment 50 to interact with cloud computing environment 50 through management layer 80 to perform tasks and functions (e.g., administrative tasks) separate from actual execution of functions in the cloud computing environment 50. For example, an administrator may request access to a certain amount of computing resources (e.g., as provided in virtualization layer 70 and/or hardware and software layer 60) in cloud computing environment 50 via management layer 80 without having a specific knowledge of, or interacting directly with, virtualization layer 70 and/or hardware and software layer 60.

Workloads layer 90 provides examples of functionality for which the cloud computing environment may be utilized. The workloads and functions illustrated in workloads layer 90 are merely exemplary workloads and functions that may be executed in cloud computing environment 50 at the request or direction of a subscriber to cloud computing environment 50, and are not limited to those explicitly recited herein. Examples of workloads and functions which may be provided from this layer include: mapping and navigation 91; software development and lifecycle management 92; virtual classroom education delivery 93; data analytics processing 94; transaction processing 95; and honeypot configuration 96 (e.g., as described above with reference to the honeypot configuration engine 142 of FIG. 1 and the neural network 174 of FIG. 2). These workloads and functions of workloads layer 90 may be end-user applications that enable a subscriber to cloud computing environment 50 to interact with any of management layer 80, virtualization layer 70, and/or hardware and software layer 60 indirectly via workloads layer 90 without having a specific knowledge of, or interacting directly with, any of management layer 80, virtualization layer 70, and/or hardware and software layer 60. In this manner, the subscriber and/or an end user who accesses cloud computing environment 50 may not require any form of specialized knowledge relating to the composition or operation of any of management layer 80, virtualization layer 70, and/or hardware and software layer 60 to perform the workloads and functions of workloads layer 90. In such a scenario, the workloads and functions of workloads layer 90 are said to be abstracted from management layer 80, virtualization layer 70, and hardware and software layer 60 because workloads layer 90 hides the underlying operation of management layer 80, virtualization layer 70, and hardware and software layer 60 from the subscriber and/or end-user while still enabling the subscriber and/or end-user to indirectly interact with management layer 80, virtualization layer 70, and/or hardware and software layer 60 to receive the computer processing benefits thereof via workloads layer 90.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    crawling, by a web crawler, one or more webpages to gather information, resulting in gathered information;
    generating candidate content based on the gathered information by generating fake notes appearing to be about the gathered information and appearing to tie the gathered information to fake project names assigned to honeypot content deployed by a honeypot;
    obtaining, by a honeypot logger, activity log data of one or more hackers that access a portion of the honeypot content;
    training a neural network using training data based on the activity log data;
    determining a feature vector based on the gathered information and the activity log data;
    determining, by the neural network, weights associated with different categories of the candidate content based on the feature vector; and
    selecting the honeypot content from the candidate content based on the weights, wherein selecting the honeypot content based on the weights comprises selecting different amounts of the different categories of the candidate content based on the weights.

2. The computer-implemented method of claim 1, wherein determining the feature vector comprises:
    parsing the activity log data to determine first categories associated with the portion of the honeypot content;
    performing topic detection on the gathered information to identify one or more topics; and
    determining the feature vector based on the first categories and the one or more topics.

3. The computer-implemented method of claim 2, wherein the first categories are indicative of which categories of the honeypot content the one or more hackers are interested in, and wherein the one or more topics are indicative of current events that are likely to be of interest to the one or more hackers.

4. The computer-implemented method of claim 1, wherein the gathered information comprises current news articles and social media activity regarding a company that uses the honeypot.

5. The computer-implemented method of claim 2, further comprising storing a set of template notes that include blank portions for insertion of the one or more topics.

6. The computer-implemented method of claim 1, wherein the neural network includes an output layer, and wherein a number of nodes in the output layer corresponds to a number of the different categories.

7. The computer-implemented method of claim 1, wherein the different categories of the candidate content include a first category of content corresponding to financial data content, a second category of content corresponding to strategy content, a third category of content corresponding to health care data content, and a fourth category of content corresponding to intellectual property data content, and wherein selecting the honeypot content includes determining, based on the weights, an amount of the first category of content to include in the honeypot content, an amount of the second category of content to include in the honeypot content, an amount of the third category of content to include in the honeypot content, and an amount of the fourth category of content to include in the honeypot content.

8. The computer-implemented method of claim 7, further comprising:
    generating one or more documents or log files using the gathered information; and
    adding the one or more documents or log files to the candidate content.

9. A system, comprising:
    a web crawler configured to crawl one or more webpages to gather information, resulting in gathered information;
    a honeypot logger configured to obtain activity log data of one or more hackers that access a portion of honeypot content deployed by a honeypot; and
    a honeypot configuration engine coupled to the web crawler and the honeypot logger and configured to:
        generate candidate content based on the gathered information by generating fake notes appearing to be about the gathered information and appearing to tie the gathered information to fake project names assigned to the honeypot content;
        train a neural network using training data based on the activity log data;
        determine a feature vector based on the gathered information and the activity log data;
        determine, by the neural network, weights associated with different categories of the candidate content based on the feature vector; and
        select the honeypot content from the candidate content based on the weights, wherein selecting the honeypot content based on the weights comprises selecting different amounts of the different categories of the candidate content based on the weights.

10. The system of claim 9, wherein, to select the honeypot content, the honeypot configuration engine is configured to:
    parse the activity log data to determine first categories associated with the portion of the honeypot content;
    perform topic detection on the gathered information to identify one or more topics; and determine the feature vector based on the first categories and the one or more topics.

11. The system of claim 10, wherein the first categories are indicative of which categories of the honeypot content the one or more hackers are interested in, and wherein the one or more topics are indicative of current events that are likely to be of interest to the one or more hackers.

12. The system of claim 9, wherein the different categories of the candidate content include a first category of content corresponding to financial data content, a second category of content corresponding to strategy content, a third category of content corresponding to health care data content, and a fourth category of content corresponding to intellectual property data content, and wherein to select the honeypot content, the honeypot configuration engine is configured to determine, based on the weights, an amount of the first category of content to include in the honeypot content, an amount of the second category of content to include in the honeypot content, an amount of the third category of content to include in the honeypot content, and an amount of the fourth category of content to include in the honeypot content.

13. The system of claim 12, wherein the honeypot configuration engine is further configured to:
generate one or more documents or log files using the gathered information; and
add the one or more documents or log files to the candidate content.

14. A computer program product comprising a computer readable storage medium having program instructions embodied therewith, wherein the program instructions are executable by a computer to cause the computer to:
crawl one or more webpages to gather information, resulting in gathered information;
generate candidate content based on the gathered information by generating fake notes appearing to be about the gathered information and appearing to tie the gathered information to fake project names assigned to honeypot content deployed by a honeypot;
obtain activity log data of one or more hackers that access a portion of the honeypot content deployed by the honeypot;
train a neural network using training data based on the activity log data;
determine a feature vector based on the gathered information and the activity log data;
determine, by the neural network, weights associated with different categories of the candidate content based on the feature vector; and
select the honeypot content from the candidate content based on the weights, wherein selecting the honeypot content based on the weights comprises selecting different amounts of the different categories of the candidate content based on the weights.

15. The computer program product of claim 14, wherein the program instructions that are executable by the computer to cause the computer to select the honeypot content are executable by the computer to cause the computer to:
parse the activity log data to determine first categories associated with the portion of the honeypot content;
perform topic detection on the gathered information to identify one or more topics; and
determine the feature vector based on the first categories and the one or more topics.

16. The computer program product of claim 15, wherein the first categories are indicative of which categories of the honeypot content the one or more hackers are interested in, and wherein the one or more topics are indicative of current events that are likely to be of interest to the one or more hackers.

17. The computer program product of claim 14, wherein the different categories of the candidate content include a first category of content corresponding to financial data content, a second category of content corresponding to strategy content, a third category of content corresponding to health care data content, and a fourth category of content corresponding to intellectual property data content, and wherein the program instructions that are executable by the computer to cause the computer to select the honeypot content by determining, based on the weights, an amount of the first category of content to include in the honeypot content, an amount of the second category of content to include in the honeypot content, an amount of the third category of content to include in the honeypot content, and an amount of the fourth category of content to include in the honeypot content.

* * * * *